3,122,531
DYESTUFFS CONTAINING A SULFONATED-
1:3:5 TRIAZINE
John Reginald Atkinson, Frank Hall, and William Elliot
Stephen, Manchester, England, assignors to Imperial
Chemical Industries Limited, London, England, a corporation of Great Britain
No Drawing. Filed June 29, 1961, Ser. No. 120,521
10 Claims. (Cl. 260—146)

This invention relates to new dyestuffs and more particularly it relates to new water-soluble dyestuffs which are valuable for colouring textile materials, in particular cellulose textile materials.

According to the invention there are provided dyestuffs containing at least one primary or secondary amino group, said amino group or groups containing as an N-substituent a 1:3:5-triazine radical containing one or two —SO₃X groups, each of which is attached to a carbon atom of the said triazine ring, wherein X stands for an alkali metal atom or an alkaline earth metal atom.

As examples of the alkali metal atoms represented by X there may be mentioned sodium or potassium atoms, and as examples of the alkaline earth metal atoms represented by X there may be mentioned calcium or barium atoms. It is however preferred that X represents an alkali metal atom, in particular a sodium atom.

Each of the primary or secondary amino groups is directly attached to a carbon atom of an aryl radical, in particular a phenyl or naphthyl radical, present in the dyestuff radical, or each of the said amino groups is directly attached to a carbon atom of a lower alkyl chain which is itself attached directly to an aryl radical present in the dyestuff radical or is attached to the said aryl radical through a bridging atom or group, for example, —O—, —S—, —NH—,

—CONNH—, —SO₂NH— or

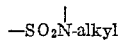

The secondary amino groups present in the new dyestuffs of the invention are preferably secondary amino groups of the formula:

wherein R repersents a cycloalkyl radical or a substituted or unsubstituted alkyl radical. As an example of a cycloalkyl radical represented by R there may be mentioned the cyclohexyl radical, and as examples of the substituted or unsubstituted alkyl radicals represented by R there may be mentioned substituted or unsubstituted lower alkyl radicals, such as methyl, ethyl, propyl and butyl radicals which may contain substituents such as hydroxy or lower alkoxy groups, for example methoxy and ethoxy groups.

The dyestuffs may be members of any of the known series of dyestuffs but preferably they are dyestuffs of the azo, which may be monoazo or polyazo, nitro, anthraquinone or phthalocyanine series.

In addition to the —SO₃X groups, as hereinbefore defined, present in the dyestuffs and which render the dyestuffs soluble in water the dyestuffs preferably contain other water-solubilising groups, such as alkyl sulphone, sulphonamido, or carboxylic acid groups, and above all sulphonic acid groups. If desired the dyestuffs, in particular dyestuffs of the azo and phthalocyanine series, may contain coordinately bound metal atoms such as coordinantly bound copper, cobalt or chromium atoms.

When the dyestuffs, as hereinbefore defined, contain only one —SO₃X group attached to the 1:3:5-triazine ring then the third carbon atom of the 1:3:5-triazine ring can carry an additional substituent. As examples of such substituents there may be mentioned halogen atoms such as chlorine and bromine atoms, lower alkyl radicals such as methyl and ethyl radicals, aryl radicals such as phenyl and tolyl radicals, hydroxy groups and substituted hydroxy groups such as methoxy, ethoxy and propoxy groups and substituted or unsubstituted aryloxy groups such as phenoxy, chlorophenoxy and methoxy groups, mercapto groups and substituted mercapto groups such as methylmercapto and phenylmercapto groups, and amino groups and substituted amino groups such as methylamino, dimethylamino, ethylamino, diethylamino, β-hydroxyethylamino, di-(β-hydroxyethylamino), anilino, N-methylanilino, 2-, 3- or 4-sulphoanilino, 2-, 3- and 4-carboxyanilino, 2:5 - disulphoanilino, 3:5 - disulphoanilino, 5-sulpho-2-carboxyanilino and 2-, 3- and 4-sulpho-N-methylanilino groups.

The new dyestuffs of the invention may be obtained by treating with an alkali or alkaline earth metal salt of sulphurous acid a dyestuff compound which contains at least one mono- or di-halogenotriazinylamino group, and this may be conveniently carried out by stirring the reactants together in water, preferably at a temperature between 0° and 30° C., adding sodium chloride and isolating the dyestuff which is precipitated. If desired the pH of the reaction mixture can be adjusted to between 6 and 8 by adding a buffering agent before isolating the dyestuff.

When a dyestuff compound is used which contains a di-halogenotriazinylamino group then it is possible, by suitable choice of the reaction conditions, to replace one or both of the halogen atoms by —SO₃X groups. In general when using such dyestuff compounds it is found that temperatures above 20° C. are necessary in order to replace both of the said halogen atoms.

As specific examples of alkali or alkaline earth metal salts of sulphurous acid which may be used to obtain the new dyestuffs of the invention there may be mentioned sodium sulphite, sodium bisulphite, potassium sulphite, calcium sulphite and barium sulphite.

The dyestuff compounds containing at least one mono- or di-halogenotriazinylamino group used to obtain the new dyestuffs of the invention may themselves be obtained by treating a dyestuff compound containing at least one primary or secondary amino group with a di- or tri-halogeno-1:3:5-triazine.

As specific examples of di- or tri-halogeno-1:3:5-triazines there may be mentioned
cyanuric chloride,
cyanuric bromide,
2:4-dichloro-1:3:5-triazine,
2-methyl-4:6-dichloro-1:3:5-triazine,
2-phenyl-4:6-dichloro-1:3:5-triazine,
2-methoxy-4:6-dichloro-1:3:5-triazine,
2-methylmercapto-4:6-dichloro-1:3:5-triazine,
2-phenylmercapto-4:6-dichloro-1:3:5-triazine,
2-anilino-4:6-dichloro-1:3:5-triazine,
2-(2', 3' or 4'-sulphoanilino)-4:6-dichloro-1:3:5-triazine,
2-(2'-, 3'- or 4'-carboxyanilino)-4:6-dichloro-1:3:5-triazine,
2-(2':5'-disulphoanilino)-4:6 dichloro-1:3:5-triazine,
2-(3':5'-disulphoanilino)-4:6-dichloro-1:3:5-triazine,
2-dimethylamino-4:6-dichloro-1:3:5-triazine
and 2-dimethylamino-4:6-dichloro-1:3:5- triazine.

Azo compounds containing at least one primary or secondary amino group may themselves be obtained by diazotising a primary aromatic amine, which may be an aminoazo compound, and coupling the diazo compound so obtained with a coupling component, the primary aromatic amine and/or the coupling component containing at least one primary or secondary amino group, or at least one group, such as a nitro or acetylamino group, which is readily converted to a primary or secondary amino group. The said primary aromatic amines may be members of any of the known series of diazotisable primary aromatic amines but preferably they are primary aromatic amines of the benzene or naphthalene series which optionally contain an arylazo group, in particular a substituted or unsubstituted phenylazo or naphthylazo group. The said coupling components may be members of any of the known series of coupling components but preferably they are coupling components of the phenol, naphthol, arylamine, acylacetoarylide, 5-aminopyrazole or 5-pyrazolone, in particular 1-aryl-5-pyrazolone, series.

Anthraquinone dyestuff compounds containing at least one primary or secondary amino group are preferably those containing a primary or secondary amino group as a substituent in an alkylamino or arylamino group attached to an alpha position of the anthraquinone nucleus, which preferably contains at least one water-solubilising group.

Phthalocyanine dyestuff compounds containing at least one primary or secondary amino group are preferably stable metal-containing phthalocyanine compounds, such as cobalt or nickel phthalocyanine compounds and, in particular, copper phthalocyanine compounds, containing at least one of the said groups, and at least one water-solubilising group such as a sulphamyl or preferably a sulphonic acid group. The primary or secondary amino groups may be attached directly to carbon atoms of the benz rings present in the phthalocyanine nucleus or they may be attached thereto through a divalent bridging group such as -phenylazo-, —CO-phenylene-, —SO$_2$-phenylene-, —NH-phenylene-, —S-phenylene-, —O-phenylene-, —CH$_2$S-phenylene-, —CH$_2$O-phenylene-, —CH$_2$-phenylene-, —SCH$_2$-phenylene-, —SO$_2$CH$_2$-phenylene, —SO$_2$NH-phenylene, $$-SO_2\overset{alkyl}{\underset{|}{N}}\text{-phenylene}$$

—NHCO-phenylene-, —CONH-phenylene-, —SO$_2$— and —CO—.

As examples of dyestuff compounds containing at least one primary or secondary amino group there may be mentioned the dyestuff compounds of the following classes without however limiting the classes to those specifically described. In the following classes the symbol "Y" is used to denote a primary or secondary amino group.

(1) Monoazo compounds of the formula

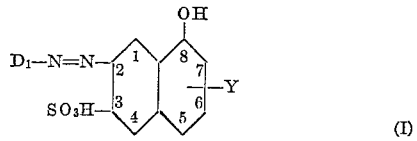

(I)

wherein D$_1$ represents a mono- or di-cyclic aryl radical which is free from azo groups and NHR groups, Y is preferably attached to the 6-, 7- or 8-position of the naphthalene nucleus, which may also contain a sulphonic acid group in the 5- or 6-position of the naphthalene nucleus.

D$_1$ may represent a radical of the naphthalene or benzene series which is free from azo substituents, for example a stilbene, diphenyl, benzithiazolylphenol or diphenylamine radical. Also in this class are to be considered the related dyestuffs in which Y, instead of being attached to the naphthalene nucleus, is attached to a benzoylamino or anilino group which is attached to the 6-, 7- or 8-position of the naphthalene nucleus.

Particularly valuable dyestuffs are obtained from those wherein D$_1$ represents a sulphonated phenyl or naphthyl radical, especially those which contain a —SO$_3$H group in ortho position to the azo link; the phenyl radical may be further substituted for example, by halogen atoms such as chlorine, alkyl radicals such as methyl, acylamino groups such as acetylamino and alkoxy radical such as methoxy.

(2) Disazo compounds of Formula I, wherein D$_1$ stands for a radical of the azobenzene, azonaphthalene or phenylazonaphthalene series and the naphthalene nucleus is substituted as stated in class 1.

(3) Monoazo compounds of the formula:

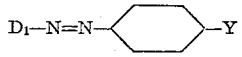

wherein D$_1$ stands for a mono or dicyclic aryl radical as described for class 1 and is preferably a disulphonaphthyl or a stilbene radical, and the benzene nucleus may contain further substituents such as halogeno atoms, or alkyl, alkoxy, carboxylic acid and acylamino groups.

(4) Mono- or dis-azo compounds of the formula:

   (II)

wherein D represents an arylene radical such as a radical of the azobenzene, azonaphthalene or phenylazonaphthalene series, or, preferably, an at most dicyclic arylene radical of the benzene or naphthalene series, and K represents the radical of a naphthol sulphonic acid or the radical of an enolised or enolisable ketomethylene compound (such as an acetoacetaylide or a 5-pyrazolone) having the OH group o- to the azo group. D$_1$ preferably represents a radical of the benzene series containing a sulphonic acid group.

(5) Mono- or dis-azo compounds of the formula:

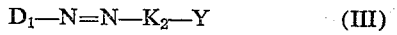   (III)

wherein D$_1$ represents a radical of the type defined for D$_1$ in classes 1 and 2 above and K$_2$ represents the radical of an enolisable ketomethylene compound (such as an acetoacetarylide or a 5-pyrazolone) having the —OH group in α-position to the azo group.

(6) The metal complex, e.g. the copper, chromium and cobalt complex, compounds of those dyes of Formulae I, II and III (wherein D$_1$, K and K$_2$ have all the respective meanings stated) which contain a metallisable (for example a hydroxyl, lower alkoxy or carboxylic acid) group ortho to the azo group in D$_1$.

(7) Anthraquinone compounds of the formula:

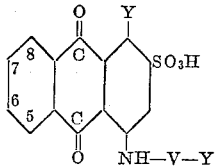

wherein the anthraquinone nucleus may contain an additional sulphonic acid group in the 5-, 6-, 7- or 8-position and V represents a bridging group which is preferably a divalent radical of the benzene series, for example phenylene, diphenylene, or 4,4'-divalent stilbene or azobenzene radicals. It is preferred that V should contain one sulphonic acid group for each benzene ring present.

(8) Phthalocyanine compounds of the formula

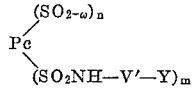

wherein Pc represents the phthalocyanine nucleus preferably of copper, phthalocyanine, ω represents a hydroxy and/or a substituted or unsubstituted amino group, V' represents a bridging group, preferably an aliphatic, cycloaliphatic or aromatic bridging group, n and m each represent 1, 2 or 3 and may be the same or different provided that n+m is not greater than 4.

(9) Nitro dyestuffs of the formula:

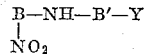

wherein B and B' represent monocyclic aryl nuclei, the nitro group in B being ortho to the NH group.

In class 1:
6-amino-1-hydroxy-2-(2'-sulphophenylazo)naphthalene-3-sulphonic acid,
6-methylamino-1-hydroxy-2-(4'-acetylamino-2'-sulphophenylazo naphthalene-3-sulphonic acid,
8-amino-1-hydroxy-2-(2'-sulphophenylazo)naphthalene-3:6-disulphonic acid,
8-amino-1-hydroxy-2(4'-chloro-2'-sulphophenylazo)-naphthalene-3:5-disulphonic acid,
7-amino-2-(2':5'-disulphophenylazo)-1-hydroxynaphthalene-3-sulphonic acid,
7-methylamino-2-(2'-sulphophenylazo)-1-hydroxynaphthalene-3-sulphonic acid,
7-methylamino-2-(4'-methoxy-2'-sulphophenylazo)-1-hydroxy-naphthalene-3-sulphonic acid,
8-(3'-aminobenzylamino)-1-hydroxy-2-(2'-sulphophenylazo)-naphthalene-3:6-disulphonic acid,
8-amino-1-hydroxy-2:2'-azonaphthalene-1':3:5'-6-tetrasulphonic acid,
6-amino-1-hydroxy-2-(4'-acetylamino-2'-sulphophenylazo)naphthalene-3-sulphonic acid,
6-methylamino-1-hydroxy-2-(4'-methoxy-2'-sulphophenylazo)-naphthalene-3-sulphonic acid,
8-amino-1-hydroxy-2-phenylazonaphthalene-3:6-disulphonic acid,
8-amino-1-hydroxy-2:2'-azonaphthalene-1':3:6-trisulphonic acid,
6-amino-1-hydroxy-2(4'-methoxy-2'-sulphophenylazo)-naphthalene-3-sulphonic acid,
8-amino-1-hydroxy-2:2'-azonaphthalene-1':3:5'-trisulphonic acid,
6-amino-1-hydroxy-2:2'-azonaphthalene-1':3:5'-trisulphonic acid,
6-methylamino-1-hydroxy-2:2'-azonaphthalene-1':3:5'-trisulphonic acid,
7-amino-1-hydroxy-2:2'-azonaphthalene-1':3-disulphonic acid,
8-amino-1-hydroxy-2-(4'-hydroxy-3'-carboxyphenylazo)-naphthalene-3:6-disulphonic acid,
6-amino-1-hydroxy-2-(4'-hydroxy-3'-carboxyphenylazo)-naphthalene-3:5-disulphonic acid.

In class 2:
8-amino-1-hydroxy-2[(2''-sulphophenylazo)-2'-methoxy-5'-methyl-phenylazo]naphthalene-3:6-disulphonic acid,
8-amino-1-hydroxy-2[4'-(4''-methoxyphenylazo)-2'-carboxyphenylazo]naphthalene-3:6-disulphonic acid,
8-amino-1-hydroxy-2-[4'-(2''-hydroxy-3'':6''-disulpho-1''-naphthylazo)-2'-carboxyphenylazo] naphthalene-3:6-disulphonic acid,
4:4'-bis(8''-amino-1''-hydroxy-3'':6''-disulpho-2''-naphthylazo)-3:3'-dimethoxyphenyl,
6-amino-1-hydroxy-2-[4'-(2''-sulphophenylazo)-2'-methoxy-5'-methylphenylazo]naphthalene-3:5-disulphonic acid,
1-amino-4-[4'-(4''-sulphophenylazo)-2'-sulphophenylazo]naphthalene-6-sulphonic acid.

In class 3:
2-(4'-amino-2'-methylphenylazo)naphthalene-4:8-disulphonic acid,
2-(4'-amino-2'-acetylaminophenylazo)naphthalene-5:7-disulphonic acid,
4-nitro-4'-(4''-methylaminophenylazo)stilbene-2:2'-disulphonic acid,
4-nitro-4'-(4''-amino-2''-methyl-5''-methoxyphenylazo)-stilbene-2:2'-disulphonic acid,
2-(4'-amino-2'-acetylaminophenylazo)-naphthalene-4:8-disulphonic acid,
4-amino-4'-(4''-methoxyphenylazo)stilbene-2:2'-disulphonic acid,
4-amino-2-methylazobenzene-2':5'-disulphonic acid.

In class 4:
1-(2':5'-dichloro-4'-sulphophenyl)-3-methyl-4-(3''-amino-4''-sulphophenylazo)-5-pyrazolone,
1-(4'-sulphophenyl)-3-carboxy-4-(4''-amino-3''-sulphophenylazo)-5-pyrazolone,
1-(2'-methyl-5'-sulphophenyl)-3-methyl-4-(4''-amino-3''-sulphophenylazo)-5-pyrazolone,
1-(2'-sulphophenyl)-3-methyl-4-(3''-amino-4''-sulphophenylazo)-5-pyrazolone,
4-amino-4'-(3''-methyl-1''-phenyl-4''-pyrazol-5''-onylazo)stilbene-2:2'-disulphonic acid,
4-amino-4'-(2''-hydroxy-3'':6''-disulpho-1''-naphthylazo)stilbene-2:2'-disulphonic acid,
8-acetylamino-1-hydroxy-2-(3'-amino-4'-sulphophenylazo)naphthalene-3:6-disulphonic acid,
7-(3'-sulphophenylamino)-1-hydroxy-2-(4'-amino-2'-carboxyphenylazo)naphthalene-3-sulphonic acid,
8-phenylamino-hydroxy-2-(4'-amino-2'-sulphophenylazo)naphthalene-3:6-disulphonic acid,
6-acetylamino-1-hydroxy-2-(5'-amino-2'-sulphophenylazo)naphthalene-3-sulphonic acid,
6-ureido-1-hydroxy-2-(5'-amino-2'-sulphophenylazo)-naphthalene-3-sulphonic acid,
8-benzoylamino-1-hydroxy-2-(5'-amino-2'-sulphophenylazo)naphthalene-3:6-disulphonic acid,
1-(4':8'-disulphonaphth-2'-yl)-3-methyl-4-(5''-amino-2''-sulphophenylazo)-5-pyrazolone,
1-(2'-sulphophenyl)-3-carboxy-4-(5''-amino-2''-sulphophenylazo)-5-pyrazolone,
1-(2':5'-dichloro-4'-sulphophenyl)-3-methyl-4-(5''-amino-2''-sulphophenylazo)-5-pyrazolone.

In class 5:
1-(3'-aminophenyl)-3-methyl-4-(2':5'-disulphophenylazo)-5-pyrazolone,
1-(3'-aminophenyl)-3-carboxy-4-(2'-carboxy-4'-sulphophenylazo)-5-pyrazolone,
4-amino-4'-[3''-methyl-4''-(2''':5'''-disulphophenylazo)-1''-pyrazol-5''-onyl]stilbene-2:2'-disulphonic acid,
1-(3'-aminophenyl)-3-carboxy-4-[4''-(2''':5'''-disulphophenylazo)-2''-methoxy-5''-methylphenylazo]-5-pyrazolone.

In class 6:
The copper complex of 8-amino-1-hydroxy-2-(2'-hydroxy-5'-sulphophenylazo)naphthalene-3:6-disulphonic acid,
The copper complex of 6-amino-1-hydroxy-2-(2'-hydroxy-5'-sulphophenylazo)naphthalene-3-sulphonic acid,
The copper complex of 6-amino-1-hydroxy-2-(2'-hydroxy-5'-sulphophenylazo)naphthalene-3:5-disulphonic acid,
The copper complex of 8-amino-1-hydroxy-2-(2'-hydroxy-3'-chloro-5'-sulphophenylazo)naphthalene-3:6-disulphonic acid,
The copper complex of 6-methylamino-1-hydroxy-2-(2'-carboxy-5'-sulphophenylazo)naphthalene-3-sulphonic acid,
The copper complex of 8-amino-1-hydroxy-2[4'-(2''-sulphophenylazo)-2'-methoxy-5'-methylphenylazo]naphthalene-3:6-disulphonic acid,
The copper complex of 6-amino-1-hydroxy-2-[4'-(2'':5''-disulphophenylazo)-2'-methoxy-5'-methylphenylazo]naphthalene-3:5-disulphonic acid,
The copper complex of 1-(3'-amino-4'-sulphophenyl)-3-methyl-4-4''-(2''':5'''-disulphophenylazo)-2''-methoxy-5''-methylphenylazo-5-pyrazolone,
The copper complex of 7-(4'-amino-3'-sulphoanilino)-1-hydroxy-2-[4''-(2''':5'''-disulphophenylazo)-2''-methoxy-5''-methylphenylazo]-naphthalene-3-sulphonic acid,
The copper complex of 6-(4'-amino-3'-sulphoanilino)-1-hydroxy-2-(2''-carboxyphenylazo)naphthalene-3-sulphonic acid,
The 1:2-chromium complex of 7-amino-6'-nitro-1:2'-dihydroxy-2:1'-azonaphthalene-3:4-disulphonic acid,
The 1:2-chromium complex of 6-amino-1-hydroxy-2-(2'-carboxyphenylazo)-naphthalene-3-sulphonic acid,
The 1:2-chromium complex of 8-amino-1-hydroxy-2-(4'-nitro-2'-hydroxyphenylazo)naphthalene-3:6-disulphonic acid,
The 1:2-cobalt complex of 6-(4'-amino-3'-sulphoanilino)-

1-hydroxy-2-(5''-chloro-2''-hydroxyphenyl-
azo)naphthalene-3-sulphonic acid,

The 1:2-chromium complex of 1-(3'-amino-4'-
sulphophenyl)-3-methyl-4-(2''-hydroxy-4''-sulpho-
1''-naphthylazo)-5-pyrazolone, The 1:2-chromium complex of 7-(4'-sulphoanilino)-1-
hydroxy-2-(4''-amino-2''-carboxyphenylazo)naph-
thalene-3-sulphonic acid, The 1:2-chromium complex of 1-(3'-aminophenyl)-3-
methyl-4-(4''-nitro-2''-carboxyphenylazo)-
5-pyrazolone, The 1:2-chromium complex of 6-amino-6'-nitro-1:2'-
dihydroxy-2:1'-azonaphthalene-3:4'-disulphonic acid, The 1:2-cobalt complex of 6-amino-6'-nitro-1:2'-
dihydroxy-2:1'-azonaphthalene-3:4'-disulphonic acid, The 1:2-chromium complex of 8-amino-1-hydroxy-2-(2'-
hydroxy-5'-nitrophenylazo)naphthalene-3:6-
disulphonic acid, The (1:2-chromium complex of 1-(3'-aminophenyl)-3-
methyl-4-(2''-carboxy-4''-sulphophenylazo)-5-
pyrazolone.

In class 7:

1-amino-4-(3'-amino-4-sulphoanilino)anthraquinone-
2-sulphonic acid, 1-amino-4-(4'-amino-3'-sulphoanilino)anthraquinone-
2:5-disulphonic acid, 1-amino-4-[(4''-amino-3''-sulphophenyl)anilino
anthraquinone-2:5-disulphonic]acid, 1-amino-4-[4'-(4''-amino-2''-sulphophenylazo)anilino]-
anthraquinone-2:5-disulphonic acid, 1-amino-4-(4'-methylamino-3'-sulphoanilino)-
anthraquinone-2-sulphonic acid, Mixture of 1-amino-4[4'-(4''-aminophenylazo)anilino]-
anthraquinone-2:2'':5- and -2:2'':8-trisulphonic acids, Mixture of 1-amino-4-[4'-{β-4''-aminophenyl)vinyl}-
anilino]anthraquinone-2:2'':3':5- and -2:2'':3':8-
tetrasulphonic acids.

In class 8:

3-(3'-amino-4'-sulphophenyl)sulphamyl copper
phthalocyanine-tri-3-sulphonic acid, Di-4-(3'-amino-4-sulphophenyl)sulphamyl copper
phthalocyanine-disulphonic acid, 3- or 4-(3'- or 4'-aminophenyl)sulphamyl copper
phthalocyanine-sulphonamide sulphonic acid.

In class 9: 4-amino-2'-nitro-diphenylamine-3:4-disul-
phonic acid.

Specific examples of dyestuff compounds containing at least one mono- or di-halogenotriazinylamino group which may be used to obtain the new dyestuffs of the invention are described in United States patent specifications Nos. 2,889,323, 2,892,828, 2,892,829, 2,892,830, 2,892,831, 2,907,762, 2,951,070, 2,951,071, 2,951,072, 2,951,836, 2,963,560, 2,964,520, 2,977,353 and 2,979,498, and in British specifications Nos. 209,723, 298,494, 467,815, 503,609, 781,930, 802,935, 803,473, 805,562, 828,353, 829,042, 832,400, 833,396, 834,304, 836,248, 836,647, 837,035, 837,124, 837,953, 837,985, 837,990, 838,307, 838,311, 838,335, 838,340 to 838,345, 838,728, 843,985, 844,869, 846,949, 847,635, 850,559, 851,537, 852,911, 854,432, 855,792, 859,198, 859,989, 859,990, 863,754, 863,758 and 864,227.

One preferred class of the new dyestuffs of the invention are the dyestuffs which are represented by the formula:

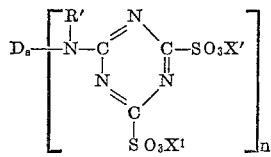

wherein $D_s$ is a dyestuff radical selected from the class consisting of azo, anthraquinone, nitro and phthalocyanine dyestuff radicals containing at least one sulphonic acid group, R' is selected from the class consisting of hydrogen atoms and lower alkyl radicals, n is selected from the class consisting of 1 and 2, and X' is an alkali metal atom selected from the class consisting of sodium and potassium atoms.

A second preferred class of the new dyestuffs of the invention are the dyestuffs which are represented by the formula:

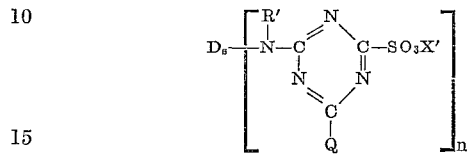

wherein $D_s$, R', n and X' have the meanings stated above, and Q represents a group selected from the class consisting of amino and substituted amino groups. The substituted amino groups represented by Q are preferably phenylamino groups containing at least one sulphonic acid or carboxylic acid group.

A third preferred class of the new dyestuffs of the invention are the dyestuffs which are represented by the formula:

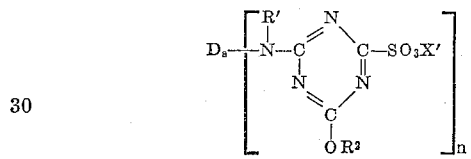

wherein $D_s$, R', n and X' have the meanings stated above, and $R^2$ represents a hydrogen atom or a lower alkyl radical, in particular a methyl radical.

The new dyestuffs are valuable for colouring natural and artificial textile materials containing acylatable amino or hydroxyl groups, for example textile materials of cotton, viscose rayon and other regenerated celluloses, wool, silk, polyamides and modified polyacrylonitrile fibres. For this purpose the dyestuffs can be applied to the textile materials by dyeing, padding or printing using printing pastes containing the conventional thickening agents or oil-in-water emulsions or water-in-oil emulsions, whereby the textile materials are coloured in bright shades, possessing excellent fastness to light and to wet treatments such as washing.

The new dyestuffs are particularly valuable for colouring cellulose textile materials. For this purpose the dyestuffs are preferably applied to the cellulose textile material in conjunction with a treatment with an acid-binding agent, for example sodium carbonate, sodium metasilicate, trisodium phosphate or sodium hydroxide, which may be applied to the cellulose textile material before, during or after the application of the dyestuff. Alternatively when the dyed textile material is to be subsequently heated or steamed a substance, such as sodium bicarbonate or sodium trichloroacetate, which on heating or steaming liberates an acid-binding agent can be used.

For example, the cellulose textile material can be coloured by treating the cellulose textile material with an aqueous solution or suspension of the acid-binding agent and then immersing the so-treated cellulose textile material in a dyebath comprising a solution of one or more of the new dyestuffs, as hereinbefore defined, at a temperature of between 0° and 100° C., removing the dyed cellulose textile material from the dyebath and if desired subjecting the dyed cellulose textile material to a treatment in a hot aqueous solution of soap.

If desired the cellulose textile material which has been treated with an aqueous solution or suspension of the acid-binding agent may be passed between rollers to remove excess aqueous solution or suspension of the acid-binding agent and/or dried before being treated with the aqueous solution of the said dyestuffs.

Alternatively the aqueous solution of the dyestuff may be applied by padding to the cellulose textile material which has been treated with the acid-binding agent and the cellulose textile material then passed through rollers and subsequently subjected to the action of heat or steam. Alternatively the cellulose textile material can be padded with an aqueous solution of one or more of the new dyestuffs, as hereinbefore defined, which also contains an acid-binding agent, passing the so-treated cellulose textile material through rollers, then if desired drying the cellulose textile material at a suitable temperature, for example 70° C. and then subjecting the cellulose textile material to the action of heat or steam. Alternatively the cellulose textile material can be dyed by immersing it in a dyebath comprising an aqueous solution of one or more of the said dyestuffs which also contains an acid-binding agent, at a suitable temperature for example between 0° and 100° C. and thereafter removing the cellulose textile material from the dyebath, if desired subjecting it to a treatment in a hot aqueous solution of soap and finally drying the dyed cellulose textile material. Alternatively the aqueous solution of one or more of the said dyestuffs can be applied to the cellulose textile material by a dyeing or a padding method and the coloured cellulose textile material subsequently immersed in an aqueous solution or suspension of the acid-binding agent, preferably at a temperature between 50° and 100° C. or the coloured cellulose textile material may be padded with an aqueous solution or suspension of the acid-binding agent, the textile material dried and then subjected to the action of heat or steam. Alternatively the cellulose textile material can be dyed by immersing it in a dyebath comprising an aqueous solution of one or more of the said dyestuffs, preferably at a temperature between 20° and 100° C. and, after the textile material has absorbed some of all of the dyestuffs, adding an acid-binding agent and proceeding with the dyeing at the same or a different temperature.

The concentration of the acid-binding agent present in the aqueous solution of the dyestuffs is not critical but it is preferred to use between 0.1% and 10% of the acid-binding agent based on the total weight of the aqueous solution. If desired the aqueous solution or suspension of the acid-binding agent may also contain further substances, for example electrolytes such as sodium chloride and sodium sulphate.

The aqueous solution of the dyestuffs may also contain substances which are known to assist the application of dyestuffs to textile materials, for example sodium chloride, sodium sulphate, urea, dispersing agents, surface-active agents, sodium alginate, or an emulsion of an organic liquid, for example trichloroethylene in water.

Alternatively the cellulose textile materials can be printed with a printing paste containing one or more of the new dyestuffs of the invention.

This may conveniently be brought about by applying a printing paste containing the dyestuff or dyestuffs to a cellulose textile material which has been impregnated with an acid-binding agent and thereafter subjecting the printed cellulose textile material to the action of heat or steam. Alternatively a printing paste containing one or more of the dyestuffs and also containing an acid-binding agent can be applied to the cellulose textile material and the printed cellulose textile material subsequently subjected to the action of heat or steam. Alternatively a printing paste containing one or more of the dyestuffs can be applied to the cellulose textile material which is subsequently immersed in a hot aqueous solution or suspension of the acid-binding agent or alternatively the printed textile material is impregnated with an aqueous solution or suspension of the acid-binding agent and subsequently subjected to the action of heat or steam.

After applying the printing paste to the cellulose textile material the printed textile material may, if desired, be dried, for example at a temperature between 20° and 100° C. before the printed textile material is subjected to the action of heat or steam.

The cellulose textile material may be printed with the printing paste by any of the commonly known methods of applying printing pastes to textile materials, for example by means of roller printing, screen printing, block printing, spray printing or stencil printing. The printing pastes may also contain the commonly used adjuvants, for example, urea, thickening agents, for example methyl cellulose, starch locust bean gum, sodium alginate, water-in-oil emulsions, oil-in-water emulsions, surface-active agents, sodium m-nitrobenzene sulphonate, and organic liquids, for example ethanol.

At the conclusion of the dyeing and/or printing processes it is preferred to subject the so-coloured cellulose textile materials to a "soaping" treatment, which may be carried out by immersing the coloured textile materials for a short time, for example 15 minutes, in a hot aqueous solution of soap and/or detergent, and subsequently rinsing the coloured cellulose textile material in water before drying it.

The new dyestuffs can be applied to nitrogen-containing textile materials such as wool and polyamide textile materials, from a mildly alkaline, neutral, or acid dyebath. The dyeing process can be carried out at a constant or substantially constant pH, that is to say the pH of the dyebath remains constant or substantially constant during the dyeing process, or if desired the pH of the dyebath can be altered at any stage of the dyeing process by the addition of acids or acid salts or alkalis or alkaline salts. For example dyeing may be started at a dyebath pH of about 3.5 to 5.5 and raised during the dyeing process to about 6.5 to 7.5 or higher if desired. The dyebath may also contain substances which are commonly used in the dyeing of nitrogen-containing textile materials. As examples of such substances there may be mentioned ammonium acetate, sodium sulphate, ethyl tartrate, non-ionic dispersing agents such as condensates of ethylene oxide with amines, fatty alcohols or phenols, surface-active cationic agents such as quaternary ammonium salts for example cetyl trimethylammonium bromide and cetyl pyridinium bromide and organic liquids such as n-butanol and benzyl alcohol.

The new dyestuffs of the invention are superior to the corresponding dyestuffs containing halogenotriazinyl-amino groups (that is the corresponding dyestuffs in which the —$SO_3X$ groups attached to the triazine ring are replaced by halogen atoms) in that they give dyeings on cellulose textile materials which are of heavier depth of shade.

The invention is illustrated but not limited by the following examples in which the parts and percentages are by weight.

*Example 1*

A suspension of the sodium salt of 4-(4":6"-dichloro-s-triazinylamino)-azobenzene-4'-sulphonic acid in 1550 parts of water and 120 parts of acetone (obtained by interaction of 29.7 parts of 4-aminoazobenzene-4'-sulphonic acid, 4.2 parts of sodium carbonate and 20 parts of cyanuric chloride in aqueous acetone solution) is added to a solution of 27 parts of sodium sulphite in 170 parts of water at room temperature. The solution is heated to 30° C. and after 1 hour at 30° C. it is cooled to 20° C. and stirred overnight. The solution is filtered to remove insoluble material and 20 pounds of sodium chloride are added for each 10 gallons of solution. The mixture is filtered, and the residue on the filter is dried at 40° C. under vacuum. The product obtained is a yellow solid freely soluble in water. It contains no organically bound chlorine. When boiled with dilute acid, it liberates sulphur dioxide in amounts equivalent to 1.9 molecules for each azo group present.

*Example 2*

A solution of the disodium salt of 1-amino-4-[4'-

(4":6" - dichloro-s-triazinylamino)-3'-sulphoanilino]-anthraquinone-2-sulphonic acid in 850 parts of water and 40 parts of acetone (obtained by interaction of 20 parts of the disodium salt of 1-amino-4-(4'-amino-3'-sulphoanilino)-anthraquinone-2-sulphonic acid and 6.9 parts of cyanuric chloride) is added to a solution of 9.5 parts of sodium sulphite in 60 parts of water. The mixture is stirred at 15° C. for 2 hours. 300 parts of sodium chloride are added, the suspension so obtained is filtered, and the residue on the filter is dried under vacuum at 40° C. Analysis shows the presence of 0.1 atom of organically bound chlorine and 3.65 atoms of sulphur for each 6 nitrogen atoms present.

*Example 3*

The process described in Example 2 is repeated using a solution of 5.7 parts of sodium sulphite. A product is obtained containing 2.9 atoms of sulphur and 0.9 atom of organically bound chlorine for each 6 nitrogen atoms present.

*Example 4*

A solution of the disodium salt of 1-amino-4-[4'-(4":6" - dichloro-s-triazinylamino)-3'-sulphoanilino]-anthraquinone-2-sulphonic acid, as used in Example 2, is stirred with a solution of 9.5 parts of sodium sulphite in 60 parts of water at 70° C. for 2 hours and then at 20° C. for 16 hours. Potassium acetate is added at the rate of 11.5 lb. for each 10 gallons of solution, and the precipitate which forms is filtered off and dried at 50° C. under vacuum.

Analysis shows that the product so obtained contains no chlorine atoms and 3 sulphur atoms for each 6 nitrogen atoms. It corresponds to a compound in which the two chlorine atoms of the starting material have been replaced by 1 ($SO_3K$) group and one hydroxyl group.

*Example 5*

5.5 parts of the disodium salt of 4-(4":6"-dichloro-s-triazinylamino) - 2' - nitrodiphenylamine-3:4'-disulphonic acid are added to a solution of 2.38 parts of sodium sulphite in 19 parts of water at 15° C. The mixture is stirred for 45 minutes. 20 parts of sodium chloride are added and the precipitate obtained is filtered off and dried at 40° C. under vacuum. The product contains 3.95 atoms of sulphur for each 6 nitrogen atoms and substantially corresponds to a product in which the two chlorine atoms of the reactant molecule have been replaced by ($SO_3Na$) groups.

*Example 6*

The process described in Example 5 is repeated at a temperature of 35° C. Analysis of the product indicates that there is present 1 ($SO_3Na$) and 1 hydroxy group on the triazine ring.

*Example 7*

16.5 parts of the trisodium salt of 7-(2'-sulphophenylazo) - 1 - (4":6"-dichloro-s-triazinylamino)-8-naphthol-3:6-disulphonic acid are dissolved in 280 parts of water and 20 parts of acetone and the solution is added to a solution of 5.5 parts of sodium sulphite in 35 parts of water at 5° C. The solution is stirred for 2 hours at a temperature between 5 and 10° C. 30 parts of potassium chloride are added and the precipitate which forms is filtered off and dried at 40° C. under vacuum. The red powder so obtained contains 0.1 atom of organically bound chlorine and 4.8 atoms of sulphur for each azo group.

*Example 8*

12.5 parts of disodium 2-[4'-(4":6"-dichloro-s-triazinylamino) - 2' - methylphenylazo]-naphthalene-4:8-disulphonic acid are dissolved in 700 parts of water and the solution is added to a solution of 5.5 parts of sodium sulphite in 35 parts of water at 15° C. The mixture is heated to 30° C. and stirred for 1½ hours, cooled to room temperature and then stirred overnight. 142 parts of sodium chloride are added and the precipitate obtained is filtered off and dried at 40° C. under vacuum. The yellow powder obtained contains no organically bound chlorine and 3.68 atoms of sulphur for each azo group.

*Example 9*

A solution of the trisodium salt of 1-amino-4-[4'-(4":6"-dichloro-s - triazinylamino) - 3' - sulphoanilino]-anthraquinone-2:5-disulphonic acid in 950 parts water and 45 parts acetone (obtained by interaction of 23.8 parts of the trisodium salt of 1-amino-4-(4'-amino-3'-sulphoanilino)anthraquinone-2:5-disulphonic acid, 6.9 parts of cyanuric chloride and 2 parts of sodium carbonate) is added to a solution of 9.5 parts of sodium sulphite in 60 parts of water at a temperature between 5° C. and 10° C. The mixture is stirred for 2 hours at 10° C. 90 parts of potassium chloride are added, the suspension is filtered and the residue on the filter is dried under vacuum at 40° C. Analysis shows the presence of no organic chlorine and 4.9 atoms of sulphur for each 6 nitrogen atoms present.

*Example 10*

A solution of 16 parts of sodium sulphite in 100 parts of water is added during 10 minutes to a solution of 15.4 parts of 2-nitro-4'-(4":6"-dichloro-s-triazinylamino)-diphenylamine-4-sulphondimethylamide in 320 parts of tetrahydrofuran at room temperature. The mixture is heated to 30° C. and stirred at 30° C. for 3 hours. 137 parts of sodium chloride are added and the precipitate obtained is filtered off and stirred with 650 parts of water at 40° C. The solution obtained is filtered and 80 parts of sodium chloride are added to the filtrate. The suspension so obtained is filtered and the residue on the filter is dried under vacuum at 40° C. Analysis shows the presence of no organic chlorine and 2.9 sulphur atoms for each 7 nitrogen atoms present.

*Example 11*

A solution of the disodium salt of 2-N-(4":6"-dichloro-s-triazinylamino)-N-methylamino - 8 - hydroxy - 7 - (4'-methoxy-2'-sulphophenylazo)-naphthalene - 6 - sulphonic acid, in 2460 parts of water and 60 parts of acetone (obtained by interaction in aqueous acetone of 4 parts of sodium carbonate, 14 parts of cyanuric chloride and 38.4 parts of the disodium salt of the monoazo compound obtained by coupling diazotised 4-amino-3-sulphoanisole with 2 - methylamino-8-hydroxynaphthalene-6-sulphonic acid under alkaline conditions) is added to a solution of 19 parts of sodium sulphite in 120 parts of water at a temperature below 5° C. The mixture is stirred for 16 hours, allowing its temperature to rise to 20° C. The mixture is filtered and 250 parts of sodium chloride are added to the filtrate. The suspension so obtained is filtered and the residue on the filter is dried at 40° C. under vacuum. Analysis shows the presence of 0.05 atom of organically bound chlorine and 3.95 atoms of sulphur for each azo group present.

*Example 12*

A solution of the disodium salt of 2-(4":6"-dichloro-s-triazinylamino) - 5 - hydroxy - 6 - (2' - sulphophenylazo)-naphthalene-7-sulphonic acid in 1100 parts of water and 110 parts of acetone (obtained by interaction in aqueous acetone of 5.3 parts of sodium carbonate, 18.5 parts of cyanuric chloride and 46.7 parts of the disodium salt of 2-amino-5-hydroxy-6-(2'-sulphophenylazo) - naphthalene-7-sulphonic acid) is added to a solution of 26 parts of sodium sulphite in 160 parts of water at a temperature between 5° C. and 10° C. The mixture is stirred for 2 hours at 10° C. and 2½ hours at a temperature between 10° C. and 18° C., filtered and 150 parts of sodium chloride are added to the filtrate. The suspension so obtained is filtered and the residue on the filter is dried at 40° C. under vacuum. Analysis shows the presence of 0.1 atom of organically bound chlorine and 3.9 atoms of sulphur for each azo group present in the molecule.

*Example 13*

50 parts of the sodium salt of copper phthalocyanine-tetra-4-sulphonic acid are dissolved in 475 parts of chlorosulphonic acid at 20° C. and the solution is stirred and heated to 115° C. and maintained at a temperature between 115° C. and 120° C. for 4 hours. The resulting solution is cooled and drowned carefully into ice-water, maintaining the temperature below 2° C. by addition of ice. The precipitated sulphonchloride is filtered off at a temperature below 5° C., drained well and the residue on the filter is suspended in 1,000 parts of ice-water and neutralised to litmus by addition of sodium bicarbonate. 33.6 parts of sodium bicarbonate are added, and then there is added a solution prepared by dissolving 28.5 parts of meta-phenylene-diamine sulphonic acid and 15.6 parts of sodium bicarbonate in 200 parts of water. The mixture is stirred for 16 hours allowing the temperature to rise to 20° C. then hydrochloric acid of specific gravity 1.18 is added until the mixture is strongly acid.

The product which separates is filtered off, washed with 20% of aqueous hydrochloric acid and dried at 100° C.

44.2 parts of the product so obtained is suspended in 1,500 parts of water and the pH of the mixture is adjusted to 6.8 by the addition of 10% aqueous sodium carbonate solution. This mixture is cooled to a temperature below 10° C. and added to a suspension obtained by dissolving 14.8 parts of cyanuric chloride in 100 parts of acetone and pouring the solution into 400 parts of water at 10° C.

The mixture is stirred for 45 minutes adding sodium carbonate at frequent intervals to keep the reaction mixture neutral. 200 parts of sodium chloride are then added and the product which separates is filtered off and washed with 5% brine.

This product is suspended in 2,400 parts of water and a solution of 19 parts of sodium sulphite in 50 parts of water is added. The mixture is stirred at 20° C. for 5 hours. 750 parts of sodium chloride are added and the product which separates is filtered off, washed with saturated brine and dired at atmospheric temperature.

*Example 14*

36 parts of the trisodium salt of 7-(2'-sulphophenyl-azo)-1-(4″:6″-dichloro-s-triazinylamino) - 8 - naphthol-3:6-disulphonic acid are dissolved in 2000 parts of water and cooled to 10° C. A solution of 14 parts of sodium sulphite in 80 parts of water is added to this solution during 30 minutes, 10% aqueous sodium carbonate solution being added simultaneously so that the pH of the solution is maintained within the limits 6.5 and 7. The mixture is stirred for 1 hour and then 1.74 parts of aniline are added during 30 minutes 5% sodium carbonate solution being added simultaneously so that the pH remains within the limits 6.5 and 7. The mixture is stirred for 2 hours at a temperature between 10° and 20° C. and is then filtered. Sodium chloride is then added to the filtrate at the rate of 1 part of sodium chloride for every 10 parts of filtrate. The product which precipitates is filtered off, washed with 15% brine and dried at 40° C.

Analysis shows the presence of no organically bound chlorine and the product liberates sulphur dioxide when boiled with dilute acid in an amount equivalent to 0.81 molecule for each azo group present.

In place of the 1.74 parts of aniline used in the above example there are used 1 part of a concentrated aqueous solution of ammonium hydroxide or 1.2 parts of β-hydroxyethylamine or 1.75 parts of di(β-hydroxyethyl)-amine or 2.5 parts of o-toluidine when similar dyestuffs are obtained.

*Example 15*

The process described in Example 11 is repeated but using a solution of 12.6 parts of sodium sulphite and iso-lating the product after stirring for 3 hours. The product so obtained contains 1.3 atoms of organically bound chlorine and 0.6 atom of sulphur for each azo group present.

*Example 16*

15.7 parts of 1-amino-[4'-(2″:4″-dichloro-s-triazinyl)-aminoanilino]anthraquinone-2:5:3'-trisulphonic acid are dissolved in 450 parts of water at 10° C. and the pH of the solution is adjusted to between 6.5 and 7. An aqueous solution containing 4.2 parts of sodium bisulphite is neutralised with sodium carbonate solution to give a pH of 6.5. This solution containing a mixture of sodium bisulphite and sodium sulphite is added to the solution of the anthraquinone compound and simultaneously a solution of sodium carbonate is added to maintain the pH of the mixture within the limits 6.5 to 7. The solution is then stirred for 30 minutes and potassium chloride is added at the rate of 1 part for every 10 parts of solution. The precipitated solid is filtered off, washed with 10% aqueous potassium chloride solution and dried at 40° C.

The product so obtained contains no organically bound chlorine. It contains 4.8 molecules of sulphur for every 6 nitrogen atoms present.

*Example 17*

100 parts of plain weave cotton fabric are padded with an aqueous padding solution containing in each 100 parts of solution, 1 part of the dyestuff of Example 4, 20 parts of Glauber's salt and 0.2 part of a high sulphonated oil and squeezed between rollers until its weight is 200 parts. The fabric is then dried in air at 70° C. The fabric is then passed through an aqueous solution containing in each 100 parts, 1 part of caustic soda and 30 parts of common salt and squeezed between rollers until its weight is 200 parts. The fabric is then steamed at atmospheric pressure for one minute and subsequently washed off successively with cold and hot water, a boiling 0.3% aqueous solution of a detergent, rinsed with water and dried.

The fabric is dyed a blue shade which is extremely fast to washing.

*Example 18*

100 parts of bleached cotton fabric are dyed by the method of Example 17, replacing the dyestuff used in the padding solution of that example with 2 parts of the dyestuff of Example 2. The fabric is thus dyed to a blue shade which is extremely fast to washing.

*Example 19*

100 parts of heavy spun viscose rayon are dyed by the method of Example 17 omitting the steaming stage and using 2 parts of the dyestuff of Example 2 in the padding solution in place of the dyestuff of Example 4 the other additions being unchanged.

The fabric is thus dyed to a bright blue shade which is very fast to washing.

*Example 20*

100 parts of plain weave cotton fabric are dyed by the method of Example 17 replacing the dyestuff used in that example in the padding solution by 2 parts of the dyestuff of Example 3.

The fabric is thus dyed to a bright blue shade which is extremely fast to washing.

*Example 21*

100 parts of bleached plain weave cotton fabric are dyed by the method of Example 17 replacing the dyestuff used in the padding solution in that example with 1 part of the dyestuff of Example 5.

The fabric is thus dyed a dull yellow shade which is very fast to washing.

*Example 22*

100 parts of bleached plain weave cotton fabric are dyed by the method of Example 17 replacing the dyestuff used in the padding solution of that example with 2 parts of the dyestuff of Example 1. The fabric is thus dyed a yellow shade with excellent fastness to washing.

*Example 23*

100 parts of bleached plain weave cotton fabric are dyed by the method of Example 17 replacing the dyestuff used in the padding solution of that example with 2 parts of the dyestuff of Example 11.

The fabric is thus dyed a bright red shade of excellent fastness to washing.

*Example 24*

100 parts of plain weave bleached cotton fabric are dyed by the method of Example 17 replacing the dyestuff used in the padding solution of that example with 1 part of the dyestuff of Example 10.

The fabric is thus dyed a dull yellow shade which is fast to washing.

*Example 25*

100 parts of bleached plain weave cotton fabric are dyed by the method of Example 17 replacing the dyestuff used in the padding solution of that example with 1 part of the dyestuff of Example 13.

The fabric is thus dyed to a bright blue shade with excellent fastness to washing and light.

*Example 26*

100 parts of bleached plain weave cotton fabric are padded with a solution containing in each 100 parts 2 parts of the dyestuff of Example 12, 10 parts of sodium bicarbonate, 10 parts of Glauber's salt and 0.2 part of a condensate of an alkyl phenol with ethylene oxide and squeezed between rollers until its weight is 200 parts. The fabric is then dried in a hot flue dryer at 100° C. and is then washed off as described in Example 17.

The fabric is thus dyed to a rich orange shade possessing excellent fastness to washing and light.

*Example 27*

Lengths of 100 parts of bleached plain weave cotton fabric are dyed by the method of Example 26 using the following dyestuffs in place of the dyestuff of Example 13:

(a) The dyestuff of Example 1 (2 parts per 100 parts of padding liquor)
(b) The dyestuff of Example 2 (2 parts per 100 parts of padding liquor)
(c) The dyestuff of Example 3 (2 parts per 100 parts of padding liquor)
(d) The dyestuff of Example 4 (2 parts per 100 parts of padding liquor)
(e) The dyestuff of Example 11 (2 parts per 100 parts of padding liquor)

The patterns are dyed to the following shades: (a) yellow, (b) blue, (c) blue, (d) blue and (e) red, respectively in every case with excellent washing fastness.

*Example 28*

100 parts of cotton yarn are treated for 2 hours at 20° C. in 3,000 parts of an aqueous solution containing 2 parts of the dyestuff of Example 2, 90 parts of common salt and 5 parts of sodium carbonate. The yarn is rinsed with water, boiled in a weak soap solution, rinsed again in water and finally dried.

The yarn is dyed to a blue shade which is fast to washing.

*Example 29*

100 parts of spun viscose rayon yarn are dyed by the method of Example 28 replacing the dyestuff used in that example with 2 parts of the dyestuff of Example 1.

The yarn is thus dyed to a yellow shade possessing excellent fastness to washing.

*Example 30*

100 parts of bleached plain weave cotton fabric are padded with a solution containing per 100 parts of the dyestuff of Example 2, 20 parts of Glauber's salt and 0.2 part of a highly sulphonated oil, and squeezed between rollers and dried at 70° C. in a hot flue dryer. The fabric is then washed off as described in Example 17 and dried.

The fabric is dyed to a blue tint which is very fast to washing.

*Example 31*

100 parts of bleached plain weave cotton fabric are padded and dried as in Example 30 replacing the dyestuff used in that example with an equal weight of the dyestuff of Example 12. The fabric is then passed through a solution containing in each 100 parts 1 part of sodium dihydrogen phosphate and 20 parts of common salt. The fabric is squeezed between rollers until its weight is 200 parts and steamed for 1 minute.

The fabric is then washed off and dried as described in Example 19.

The cloth is dyed to an orange shade which is fast to washing and light.

*Example 32*

100 parts of bleached plain weave cotton fabric are dyed by the method of Example 26 replacing the dyestuff used in that example with 1 part of the dyestuff of Example 13.

The fabric is thus dyed to a bright blue shade having excellent fastness to washing and to light.

*Example 33*

A printing paste is made up with the following composition:

| | Parts |
|---|---|
| Dyestuff of Example 1 | 3 |
| Urea | 5 |
| Water | 51 |
| Sodium alginate (5% aqueous solution) | 40 |
| Sodium bicarbonate | 1 |
| | 100 |

The printing paste is applied to cotton fabric on a roller printing machine. The fabric is dried and steamed at atmospheric pressure for 5 minutes. The print is then washed in cold water, boiled in dilute soap solution for 5 minutes, rinsed, and dried. The yellow print so obtained has very good fastness to washing.

If the dyestuff of Example 2 is used in place of the dyestuff used in the printing paste of the above example, a reddish-blue print is obtained which is fast to washing.

If the dyestuff of Example 4 is used in place of the dyestuff used in the printing paste of the above example, a reddish-blue print is obtained, having good fastness to washing.

If the dyestuff of Example 9 is used in place of the dyestuff used in the printing paste of the above example, a greenish-blue print is obtained, having good fastness to washing.

If the dyestuff of Example 11 is used in place of the dyestuff used in the printing paste of the above example, a greenish-blue print is obtained, having good fastness to washing.

*Example 34*

A printing paste is made up as described in Example 33 but the dyestuff of Example 10 is used in place of the dyestuff of Example 1, and printed on light weight spun viscose rayon in place of cotton.

The reddish-yellow print so obtained has very good fastness to washing.

Example 35

A printing paste is made up having the following composition:

| | Parts |
|---|---|
| The dyestuff of Example 2 | 3 |
| Urea | 5 |
| Water | 52 |
| Sodium alginate (5% aqueous solution) | 40 |
| | 100 |

The printing paste is applied to cotton fabric on a roller printing machine. The fabric is then dried and nip-padded through a solution containing:

| | Parts |
|---|---|
| Sodium alginate (5% aqueous solution) | 10 |
| Sodium carbonate | 1 |
| Water | 89 |
| | 100 | and dried by passing round a steam-heated drum at 100° C. The print is then washed in cold water, boiled in dilute soap solution for 5 minutes, rinsed and dried.

The reddish-blue print so obtained has good fastness to washing.

Example 36

A printing paste is made up having the following composition:

| | Parts |
|---|---|
| The dyestuff of Example 13 | 3 |
| Urea | 20 |
| Water | 36 |
| Sodium alginate (5% aqueous solution) | 40 |
| Sodium bicarbonate | 1 |
| | 100 |

The printing paste is applied to cotton fabric by a silk screen printing technique. The fabric is dried and steamed at atmospheric pressure for 10 minutes. The print is then rinsed in cold water, boiled in dilute soap solution for 5 minutes, rinsed and dried.

The turquoise blue print so obtained is fast to washing.

Example 37

2 parts of the dyestuff of Example 1 are pasted with a little cold water and then sufficient warm water is added to dissolve the dyestuff. The solution so formed is added to 4,000 parts of water at 40° C. containing 4 parts of 85% aqueous formic acid, 100 parts of nylon fabric are introduced into this dyebath and the temperature is raised gradually to 95° C. and dyeing is continued at this temperature during 60 minutes. The nylon is then removed, rinsed in cold water and treated in an aqueous solution containing 0.1% to 0.2% of a condensate of ethylene oxide with an alkyl phenol and 0.2% of sodium carbonate. This treatment is commenced cold, the temperature is raised to the boil and maintained there for 10 minutes after which time the material is rinsed in cold water.

A yellow dyeing of good fastness to wet treatments is obtained.

In the above example, the 100 parts of nylon may be replaced by 100 parts of degummed pure silk. A yellow dyeing of good fastness to wet treatments is obtained.

Example 38

2 parts of the dyestuff of Example 1 are dissolved as described in Example 37 and the solution so formed is added to 3,000 parts of water at a temperature of 25° C. 100 parts of degummed pure silk are introduced into this dyebath. 90 parts of common salt are then added proportionwise during 30 minutes. After this time 6 parts of soda ash are added portionwise during 30 minutes. Dyeing is continued for a further 30 minutes then the material is removed and rinsed in cold water. The silk is then treated in an aqueous solution containing 0.1–0.2% of a condensate of ethylene oxide with an alkyl phenol and 0.1% of soda ash at 100° C. for 15 minutes, and dried.

A yellow dyeing of high wet fastness is obtained.

Example 39

2 parts of the dyestuff of Example 1 are pasted with a little cold water and sufficient warm water is added to dissolve the dyestuff. The solution so formed is added to 3000 parts of warm water. 100 parts of nylon staple fibre yarn are introduced into this dyebath and the temperature is gradually raised to 95° C. The dyebath is then exhausted by the gradual addition of 4 parts of an 85% solution of formic acid. After 1 hour the fibre is removed, rinsed in water and treated in a solution containing 1 part of a condensate of ethylene oxide with an alkyl phenol in 1000 parts of water at a temperature of 85° C. for 15 minutes then rinsed and dried. A yellow dyeing of high fastness to wet treatments is produced.

In the above example the nylon staple fibre yarn may be replaced by degummed silk fabric or a basically modified polyacrylonitrile fibre or the formic acid may be replaced by 6 parts of sulphuric acid to give similar result.

Example 40

A solution of the disodium salt of 1-amino-4-[4'-(4":6"-dichloro - s - triazin-2"-yl - N - methylamino)anilino]-anthraquinone-2:3'-disulphonic acid (which is obtained by the interaction of 13.67 parts of the disodium salt of 1-amino-4-[4'-(6-methylamino)anilino]anthraquinone-2:3'-disulphonic acid and 4.61 parts of cyanuric chloride) in a mixture of 600 parts of water and 40 parts of acetone is added to a solution of 12.6 parts of sodium sulphite heptahydrate in 90 parts of water, and the resulting mixture is stirred for 2 hours at 20° C. 150 parts of potassium chloride are then added and the precipitated dyestuff is filtered off, washed with a 25% aqueous solution of potassium chloride and dried.

When applied to cellulose textile materials in conjunction with a treatment with an acid-binding agent the dyestuff yields blue shades possessing excellent fastness to wet treatments.

In place of the 13.67 parts of the disodium salt of the anthraquinone compound used in the above example there are used:

16.22 parts of the trisodium salt of 1-amino-4-[4'-(N-methyl - amino)anilino]anthraquinone - 2:3':5 - trisulphonic acid, or 14.4 parts of the disodium salt of 1-amino-4-[3'-(N-β-hydroxyethylamino)anilino]anthraquinone - 2:5 - disulphonic acid, or 14.75 parts of the disodium salt of 1-amino-4-[4'-(N-butyl-amino)anilino]anthraquinone - 2:5 - disulphonic acid, or 14.4 parts of the disodium salt of 1-amino-4-[4'-(N-β-hydroxyethylamino)anilino]anthraquinone - 2:3'-disulphonic acid when similar dyestuffs are obtained.

Example 41

To a solution of 23.6 parts of the disodium salt of 1-[3'-(4":6"-disulpho - s - triazin - 2" - ylamino)phenyl]-3-methyl-5-pyrazolone in 500 parts of water at a temperature of 5° C. there is added an aqueous solution of diazotised 4-aminoacetanilide (which is obtained by diazotising 7.5 parts of 4-aminoacetanilide by known methods), and the resulting mixture is stirred for 2 hours at 5° C., the pH of the mixture being maintained between 7 and 8 by the additions of sodium carbonate. 30 parts of sodium chloride are then added and the precipitated dyestuff is filtered off and dried.

When applied to cellulose textile materials in conjunction with a treatment with an acid-binding agent the dyestuff yields yellow shades possessing excellent fastness to wet treatments.

In place of the aqueous solution of diazotised 4-aminoacetanilide used in the above example there is used an aqueous solution of diazotised 4-aminoazobenzene, which is obtained from 9.85 parts of 4-aminoazobenzene, whereby a yellow dyestuff is also obtained.

The disodium salt of 1-[3'-(4":6"-disulpho-s-triazin-2"-ylamino)phenyl]-3-methyl-5-yprazolone used in the above example may be obtained by stirring a mixture of 15.7 parts of sodium sulphite, 16.85 parts of 1-[3'-(4":6"-dichloro-s-triazin-2"-ylamino)phenyl-3-methyl - 5 - pyrazolone, 100 parts of water and 250 parts of tetrahydrofuran for 20 hours at 20° C., the pH of the mixture being maintained at 7 by additions of sodium carbonate, adding 25 parts of sodium chloride and filtering off and finally drying the precipitated solid.

*Example 42*

A mixture of 15.7 parts of sodium sulphite, 15.35 parts of 1-(4':6'- dichloro - 1':3':5' - triazin - 2' - ylamino) - 7-naphthol, 100 parts of water and 100 parts of tetrahydrofuran is stirred for 20 hours at 20° C., the pH of the mixture being maintained at 7 by gradual additions of sodium carbonate. 30 parts of sodium chloride are then added and the precipitated disodium salt of 1-(4':6'-disulpho-1':3':5'-triazin-2'-ylamino)-7-naphthol is filtered off, washed with a 25% aqueous solution of sodium chloride and dried.

6.1 parts of dianisidine are tetrazotised in aqueous medium and the resulting aqueous solution of tetrazotised dianisidine is added to a solution of 22.1 parts of the above disodium salt in 500 parts of water, and the resulting mixture is stirred for 2 hours at 10° C., the pH of the mixture being maintained between 7 and 8 by gradual additions of sodium carbonate. 30 parts of sodium chloride are then added and the precipitated dyestuff is filtered off and dried.

When applied to cellulose textile materials in conjunction with a treatment with an acid-binding agent the dyestuff yields blue shades possessing excellent fastness to wet treatments.

In place of the 6.1 parts of dianisidine used in the above example there are used 15.35 parts of 1-amino-4-(2':5'-dimethoxyphenylazo)naphthalene when a blue dyestuff is also obtained.

*Example 43*

A solution of 7.95 parts of the trisodium salt of the copper complex of 2-(4':6'-dichloro-1':3':5'-triazin-2'-ylamino) - 6 - (2" - hydroxy - 5" - sulphophenylazo)-5-naphthol-1:7-disulphonic acid and 2.75 parts of sodium sulphite in 250 parts of water is stirred for 16 hours at 20° C., and then for 1½ hours at 40° C. 75 parts of sodium chloride are then added, the mixture is cooled to 20° C., and the precipitated dyestuff is filtered off and dried. When applied to cellulose textile materials in conjunction with a treatment with an acid-binding agent the dyestuff yields rubine shades possessing excellent fastness to wet treatments.

*Example 44*

In place of the 44.2 parts of copper phthalocyanine-4 - sulphon - N - (3' - amino - 4' - sulphophenyl)amide-4-sulphonic acid used in Example 13 there are used 44.7 parts of copper phthalocyanine-3-sulphon-N-(3'-methylamino-4'-sulphophenyl)amide-3-sulphonic acid or 44.7 parts of copper phthalocyanine-3-sulphon-N-(4'-methylamino-3'-sulphophenyl)amide-3-sulphonic acid or 44.7 parts of copper phthalocyanine-3-sulphon-[N-(3'-amino-4'-sulphophenyl)-N-methyl]amide-3-sulphonic acid or 45.7 parts of copper phthalocyanine-3-sulphon-[N-(3'-amino - 4' - sulphophenyl) - N - (β - hydroxyethyl)]-amide-3-sulphonic acid when similar dyestuffs are obtained.

The copper phthalocyanine derivatives used in the above example may themselves be obtained by the method described in the first paragraph of Example 13 except that in each case the 50 parts of the sodium salt of copper phthalocyanine-tetra-4-sulphonic acid are replaced by 29.2 parts of copper phthalocyanine, the reaction with the chlorosulphonic acid being carried out at 135° to 140° C. instead of at 115° to 120° C., and in place of the 28.5 parts of metaphenylenediamine sulphonic acid there are used respectively 30.6 parts of 3-methylaminoaniline-4-sulphonic acid or 30.6 parts of 4-methylaminoaniline-3-sulphonic acid or 30.6 parts of 5-methylaminoaniline-2-sulphonic acid or 35.2 parts of 5-(N-β-hydroxyethylamino)aniline-2-sulphonic acid.

*Example 45*

In place of the 9.5 parts of sodium sulphite used in Example 2 there are used 11.9 parts of potassium sulphite when a similar dyestuff is obtained.

*Example 46*

19.5 parts of barium sulphite are added to a solution of 24.5 parts of the disodium salt of 2-(4':6'-dichloro-1':3':5' - triazin - 2' - ylamino) - 6 - (o - sulphophenylazo)-5-naphthol-7-sulphonic acid in 500 parts of water at 20° C., and the resulting mixture is stirred for 2½ hours at 20° C. Acetone is then added to precipitate the dyestuff which is filtered off and dried.

On analysis the dyestuff is found to be free from organically bound chlorine atoms and to contain one —OH group and one —$SO_3Ba_{1/2}$ group attached to the triazine ring. When applied to cellulose textile materials in conjunction with a treatment with an acid-binding agent the dyestuff yields orange shades possessing excellent fastness to wet treatments.

In place of the 19.5 parts of barium sulphite used in the above example there are used 14 parts of calcium sulphite dihydrate when a similar dyestuff is obtained.

*Example 47*

A solution of 13.1 parts of 2-N-(4'-chloro-6'-methoxy-s - triazine - 2' - ylamino) - 6 - (4" - methoxy - 2"-sulphophenylazo)-5-naphthol-7-sulphonic acid in 250 parts of water is added to a solution of 3 parts of sodium sulphite in 50 parts of water, and the resulting mixture is stirred for 5 hours at 30° to 32° C. The mixture is then cooled to 20° C., 125 parts of sodium chloride are added and the precipitated orange dyestuff is filtered off and dried.

*Example 48*

A solution of 30.5 parts of the disodium salt of 2 - (4':6' - dichloro - 1': 3': 5' - triazin - 2' - ylamino)-6-(o-sulphophenylazo)-5-naphthol-7-sulphonic acid in 700 parts of water is cooled to 2° C., and a solution of 4.8 parts of thioglycollic acid in 54 parts of a 10% aqueous solution of sodium carbonate is then added during 15 minutes. The resulting mixture is then stirred for 18 hours at 20° C. The mixture is then heated to 30° C., a solution of 7.5 parts of sodium sulphite in 80 parts of water is added, and the mixture is then stirred for 10 hours at 30° C. 160 parts of sodium chloride are then added and the precipitated orange dyestuff is filtered off and dried.

On analysis the dyestuff is found to contain 0.9 —$SO_3Na$ and 0.9 —$SCH_2COONa$ groups attached to cabon atoms of the triazine ring.

The following table gives further examples of new dyestuffs of the invention which are obtained when the 13.1 parts of the sodium salt of the azo compound used in Example 47 are replaced by equivalent amounts of the sodium salts of the dyestuff compounds which are obtained by condensing the amino compounds listed in the second column of the table with the s-triazine derivatives listed in the third column of the table. The fourth column of the table indicates the shades obtained when the dyestuffs are applied to cellulose textile materials in conjunction with a treatment with an acid-binding agent.

| Example | Amino Compound | s-Triazine Derivative | Shade |
|---|---|---|---|
| 49 | 1-amino-7-(phenylazo)-8-naphthol-3:6-disulphonic acid | 2:4-dichloro-6-methoxy-s-triazine | Red. |
| 50 | 2-(4'-amino-2-acetylaminophenylazo)-naphthalene-4:8-disulphonic acid | do | Yellow. |
| 51 | do | 2:4-dichloro-6-(2'-sulphoanilino)-s.triazine | Do. |
| 52 | 1-(2':5'-dichloro-4'-sulphophenyl)-3-methyl-4-(5''-amino-2''-sulphophenylazo)-5-pyrazolone | do | Do. |
| 53 | do | 2:4-dichloro-6-phenyl-1:3:5-triazine | Do. |
| 54 | do | 2:4-dichloro-6-phenoxy-1:3:5-triazine | Do. |
| 55 | do | 2:4-dichloro-6-methoxy-1:3:5-triazine | Do. |
| 56 | 2-methylamino-6-(4'-acetylamino-2'-sulphophenylazo)-5-naphthol-7-sulphonic acid | do | Reddish-orange. |
| 57 | do | 2:4-dichloro-6-(3'-sulphoanilino)-s-triazine | Do. |
| 58 | do | 2:4-dichloro-6-(3':5'-disulphoanilino)-s-triazine | Do. |
| 59 | 1-amino-4-(4'-aminoanilino)anthraquinone-2:3':5-trisulphonic acid | do | Blue. |
| 60 | do | 2:4-dichloro-6-(4'-sulphoanilino)-s-triazine | Do. |
| 61 | do | 2:4-dichloro-6-methoxy-s-triazine | Do. |
| 62 | Copper phthalocyanine-3-sulphon-N-(3'-amino-4'-sulphophenyl)amide-3-sulphonic acid | do | Greenish-blue. |
| 63 | 1:2-chromium complex of 2-amino-6-(o-carboxyphenylazo)-5-naphthol-7-sulphonic acid | do | Brown. |
| 64 | do | 2:4-dichloro-6-(3'-sulphoanilino)-s-triazine | Do. |
| 65 | Copper complex of 2-amino-6-[4'-(2'':5''-disulphophenylazo)-2'-methoxy-5'-methylphenylazo]-5-naphthol-1:7-disulphonic acid | 2:4-dichloro-6-(4'-sulphoanilino)-s-triazine | Navy blue. |
| 66 | do | 2:4-dichloro-6-methoxy-s-triazine | Do. |

The following table gives further examples of new dyestuffs of the invention which are obtained when the sodium salt of 4-(4'':6''-dichloro-s-triazinylamino)-azobenzene-4'-sulphonic acid used in Example 1 is replaced by equivalent amounts of the sodium salts of the dyestuff compounds which are obtained by condensing the amino compounds listed in the second column of the table with cyanuric chloride. The third column of the table indicates the shades obtained when the dyestuffs are applied to cellulose textile materials in conjunction with a treatment with an acid-binding agent.

| Example | Amino Compound | Shade |
|---|---|---|
| 67 | Mixture of 1-amino-4-[4'-(4''-aminophenylazo)-anilino]anthraquinone-2:2'':5- and -2:2'':8-trisulphonic acids. | Olive-green. |
| 68 | Mixture of 1-amino-4-[4'-{β-(4''-aminophenyl)-vinyl}anilino]anthraquinone-2:2''3':5- and -2:2'':3':8-tetrasulphonic acids. | Green. |
| 69 | Copper phthalocyanine-3-sulphon-N-(3'-methylaminophenyl)amide-3-sulphonic acid. | Greenish-blue. |
| 70 | Copper phthalocyanine-3-sulphon-[N-(4'-aminophenyl)-N-methyl[amide-3-sulphonamide-3-sulphonic acid. | Do. |
| 71 | 4-amino-2':4'-dinitrodiphenylamine-3-sulphonic acid. | Yellow. |
| 72 | Copper complex of 1-amino-7-(2'-hydroxy-5'-sulphophenylazo)-8-naphthol-3:6-disulphonic acid. | Violet. |
| 73 | Copper complex of 2-amino-6-(2'-hydroxy-5'-sulphophenylazo)-5-naphthol-7-sulphonic acid. | Rubine. |
| 74 | Copper complex of 2-methylamino-6-(2'-carboxy-5'-sulphophenylazo)-5-naphthol-7-sulphonic acid. | Yellowish-brown. |
| 75 | Copper complex of 2-amino-6-[4'-(2'':5''-disulphophenylazo)-2'-methoxy-5'-methylphenylazo]-5-naphthol-1:7-disulphonic acid. | Navy blue. |
| 76 | Copper complex of 1-(3'-amino-4'-sulphophenyl)-3-methyl-4-[4''-(2:5-disulphophenylazo)-2''-methoxy-5''-methylphenylazo]-5-pyrazolone. | Red. |
| 77 | 1:2-chromium complex of 7-amino-6'-nitro-1:2'-dihydroxy-2:1'-azonaphthalene-3:4'-disulphonic acid. | Greenish-blue. |
| 78 | 1:2-cobalt complex of 6-(4'-amino-3'-sulphoanilino)-1-hydroxy-2-(5''-chloro-2''-hydroxyphenylazo)-naphthalene-3-sulphonic acid. | Purple. |
| 79 | 1:2-chromium complex of 2-amino-6-(2'-carboxyphenylazo)-5-naphthol-7-sulphonic acid. | Brown. |
| 80 | 1:2-chromium complex of 1-amino-7-(2'-hydroxy-4'-nitrophenylazo)-8-naphthol-3:6-disulphonic acid. | Grey. |
| 81 | 5-(6'-methyl-7'-sulphobenzthiaz-2'-yl)-2-(4'-aminophenylazo)benzene sulphonic acid. | Reddish-yellow. |
| 82 | 1-(3'-amino-4'-sulphophenyl)-3-methyl-4 [4''-(6'''-methyl-7'''-sulphobenzthiaz-2'''-yl)-2''-sulphophenylazo]-5-pyrazolone. | Do. |
| 83 | 1-(3'-aminobenzoylamino)-7-(o-sulphophenylazo)-8-naphthol-3:6-disulphonic acid. | Bluish-red. |
| 84 | 1-amino-7-(1':5'-disulphonaphth-2'-ylazo)-8-naphthol-3:6-disulphonic acid. | Do. |
| 85 | 1-amino-7-(4'-amino-3'-sulphophenylazo)-8-naphthol-3:6-disulphonic acid. | Do. |
| 86 | 1-amino-7-[4'-(2''-sulphophenylazo)-2'-methoxy-5'methylphenylazo]-8-naphthol-3:6-disulphonic acid. | Blue. |
| 87 | 1-amino-7-[4'-methoxyphenylazo)-2'-carboxyphenylazo]-8-naphthol-3:6-disulphonic acid. | Do. |

| Example | Amino Compound | Shade |
|---|---|---|
| 88 | 4:4'-bis(1''-amino-8''-hydroxy-3'':6''-disulphonaphth-2''-ylazo)-3:3'-dimethoxydiphenyl. | Do. |
| 89 | 2-(4'-amino-2'-acetylaminophenylazo)naphthalene-5:7-disulphonic acid. | Reddish-yellow. |
| 90 | 4-nitro-4'-(4''-methylaminophenylazo)stilbene-2:2'-disulphonic acid. | Do. |
| 91 | 4-nitro-4'-(4''-amino-2''-methyl-5''-methoxyphenylazo)stilbene-2:2'-disulphonic acid. | Do. |
| 92 | 4-amino-4'-(4''-methoxyphenylazo)stilbene-2:2'-disulphonic acid. | Do. |
| 93 | 1-(2':5'-dichloro-4'-sulphophenyl)-3-methyl-4-(3''-amino-4''-sulphophenylazo)-5-pyrazolone. | Yellow. |
| 94 | 1-(6'-sulphonaphth-2'-yl)-3-methyl-4-(3''-amino-4''-sulphophenylazo)-5-pyrazolone. | Do. |
| 95 | 1-(4'-sulphophenyl)-3-carboxy-4-(4''-amino-3''-sulphophenylazo)-5-pyrazolone. | Do. |
| 96 | 4-amino-4'-(3''-methyl-1''-phenyl-5''-pyrazolon-4''-ylazo)stilbene-2:2'-disulphonic acid. | Do. |
| 97 | 4-amino-4'-(2''-hydroxy-3'':6''-disulphonaphth-1''-ylazo)stilbene-2:2'-disulphonic acid. | Orange. |
| 98 | 1-phenylamino-7-(4'-amino-2'-sulphophenylazo)-8-naphthol-3:6-disulphonic acid. | Navy blue. |
| 99 | 1-(3'-aminophenyl)-3-methyl-4-(2':5'-disulphophenylazo)-5-pyrazolone. | Yellow. |
| 100 | 1-(4'-aminophenyl)-3-methyl-4-(3'-amino-4'-sulphophenylazo)-5-pyrazolone. | Do. |
| 101 | 4-amino-4'-[3''-methyl-4''-(o-sulphophenylazo)-5''-pyrazolon-1''-yl]stilbene-2:2'-disulphonic acid. | Do. |
| 102 | 1-(3'-aminophenyl)-3-carboxy-4-[4''-(o-sulphophenylazo)-2''-methoxy-5''-methylphenylazo]-5-pyrazolone. | Do. |
| 103 | 1-amino-7-(2'-sulphophenylazo)-8-naphthol-4:6-disulphonic acid. | Red. |
| 104 | 2-amino-7-(2':5'-disulphophenylazo)-8-naphthol-6-sulphonic acid. | Do. |
| 105 | 2-ethylamino-7-(2':5'-disulphophenylazo)-8-naphthol-6-sulphonic acid. | Do. |

This application is a continuation-in-part of our application Serial No. 702,797 which was filed in the United States Patent Office on December 16, 1957, now abandoned.

What we claim is:
1. Dyestuffs of the formula:

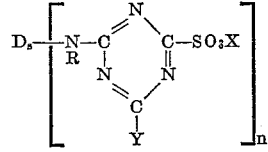

wherein $D_s$ is a dyestuff radical selected from the class consisting of azo, anthraquinone, nitro and phthalocyanine dyestuff radicals;
$n$ is a number selected from 1 and 2;
X is a metal atom selected from the class consisting of alkali and alkaline earth metal atoms;
R is selected from the class consisting of hydrogen, cyclohexyl, lower alkyl, hydroxy lower alkyl and lower alkoxy lower alkyl; and Y is selected from the class consisting of —$SO_3X$, chlorine, bromine, lower alkyl, phenyl, tolyl, hydroxy, lower alkoxy, phenoxy, chlorophenoxy, methoxy-phenoxy, mercapto, methylmercapto, phenylmercapto, carboxymethylmercapto, amino, lower alkyl amino, di (lower alkyl) amino, β-hydroxyethylamino, di(β-hydroxyethylamino), anilino, N-methylanilino, 2-, 3- and 4-sulphoanilino, 2-, 3- and 4-carboxyanilino, 2:5-disulphoanilino, 3:5-disulphoanilino, 5 sulpho-2-carboxyanilino and 2-, 3- and 4-sulpho-N-methylanilino.

2. Dyestuffs of the formula:

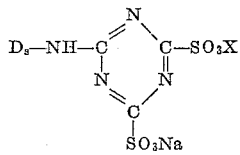

wherein $D_s$ stands for an azo dyestuffs radical, and X represents an alkali metal.

3. Dyestuffs of the formula:

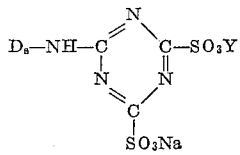

wherein $D_s$ stands for anthraquinone dyestuffs radical, and X represents an alkali metal.

4. Dyestuffs of the formula:

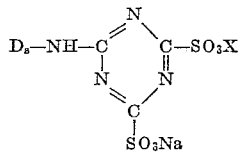

wherein $D_s$ stands for a nitro dyestuffs radical, and X represents an alkali metal.

5. Dyestuffs of the formula:

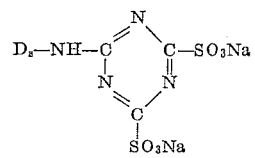

wherein $D_s$ stands for a phthalocyanine dyestuffs radical.

6. The sodium salt of the copper complex of 2-(4':6'-disulpho - 1':3':5' - triazin-2'-ylamino)-6-(2''-hydroxy-5''-sulphophenylazo)-5-naphthol-1:7-disulphonic acid.

7. The sodium salt of the copper complex of 2-(disulpho-s-triazinylamino) - 6-[4'-(2'':5''- disulphophenylazo) - 2'-methoxy - 5'-methylphenylazo]-5-naphthol-1:7-disulphonic acid.

8. The sodium salt of 2-[4'-(4'':6''-disulpho - s - triazinylamino) - 2'-methylphenylazo] - naphthalene-4:8-disulphonic acid.

9. The sodium salt of 1-amino-4-[4'-(4'':6''-disulpho-s-triazinylamino)-3'- sulphoanilino] anthraquinone - 2:5-disulphonic acid.

10. The sodium salt of 1-(4'-sulpho-6'-anilino - s - triazinylamino) - 7 - (o-sulphophenylazo)-8-naphthol-3:6-disulphonic acid.

References Cited in the file of this patent
UNITED STATES PATENTS
1,667,312    Fritzsche et al. _____ Apr. 24, 1928
OTHER REFERENCES
Venkataraman, "Synthetic Dyes," vol. 1, page 52 (1952).